(12) United States Patent
Poirier et al.

(10) Patent No.: US 12,082,320 B2
(45) Date of Patent: Sep. 3, 2024

(54) SYSTEMS AND METHODS FOR MONITORING AND MANAGING REACTIVE POWER FROM HORTICULTURAL LIGHTING SOURCES IN AN ELECTRICAL GRID

(71) Applicant: SOLLUM TECHNOLOGIES INC., Montreal (CA)

(72) Inventors: Jacques Poirier, Montreal (CA); Marc Tremblay, Montreal (CA); François Roy-Moisan, Montreal (CA); Gabriel Dupras, Montreal (CA); Florence Longpré, Montreal (CA)

(73) Assignee: SOLLUM TECHNOLOGIES INC., Montreal (CA)

( * ) Notice: Subject to any disclaimer, the term of this patent is extended or adjusted under 35 U.S.C. 154(b) by 0 days.

(21) Appl. No.: 17/865,817

(22) Filed: Jul. 15, 2022

(65) Prior Publication Data

US 2023/0014720 A1    Jan. 19, 2023

Related U.S. Application Data

(60) Provisional application No. 63/203,304, filed on Jul. 16, 2021.

(51) Int. Cl.
*H05B 45/355*      (2020.01)
*A01G 7/04*        (2006.01)

(52) U.S. Cl.
CPC .......... *H05B 45/355* (2020.01); *A01G 7/045* (2013.01)

(58) Field of Classification Search
CPC ......... H05B 45/355; A01G 7/045; H02J 3/01; H02J 3/18; H02J 3/50; Y02E 40/30
See application file for complete search history.

(56) References Cited

U.S. PATENT DOCUMENTS

| 10,938,204 B1 | 3/2021 | Carty et al. |
| 2015/0305108 A1 | 10/2015 | Probasco |
| 2016/0365726 A1 | 12/2016 | Bamberger |

(Continued)

FOREIGN PATENT DOCUMENTS

| CA | 3062229 A1 | 11/2018 |
| CN | 102821594 A | 12/2012 |

(Continued)

OTHER PUBLICATIONS

Dutch Application No. NL2032506, Search Report mailed May 31, 2023, 11 pages.

(Continued)

*Primary Examiner* — Renan Luque

(57) ABSTRACT

The present techniques generally concern methods and systems for monitoring and managing reactive power from horticultural lighting sources in an electrical grid. The techniques provided herein include determining or predicting distortive effects produced by the horticultural lighting sources, evaluating a power factor of the horticultural light sources, and based on a target power factor, adjusting the power factor of the horticultural light sources. The techniques described herein allow for an optimization of the power factor of the horticultural lighting sources in order to reduce, mitigate or eliminate the negative effects generally associated with the operation of horticultural light sources on the electrical grid.

19 Claims, 7 Drawing Sheets

(56) References Cited

U.S. PATENT DOCUMENTS

| | | | |
|---|---|---|---|
| 2017/0223807 A1 | 8/2017 | Recker et al. | |
| 2019/0098725 A1 | 3/2019 | Sadwick et al. | |
| 2020/0039367 A1 | 2/2020 | Lyden | |
| 2020/0389957 A1* | 12/2020 | Maji | H02M 1/4208 |
| 2021/0126461 A1* | 4/2021 | Poojary | H02J 3/1864 |
| 2021/0360867 A1* | 11/2021 | Goettle | A01G 7/045 |

FOREIGN PATENT DOCUMENTS

| | | |
|---|---|---|
| CN | 108370634 A | 8/2018 |
| CN | 109103923 A | 12/2018 |
| CN | 111244946 A | 6/2020 |
| CN | 113966518 A | 1/2022 |
| JP | 2009171857 A1 | 8/2009 |
| WO | 2016119063 A1 | 8/2016 |
| WO | 2021251375 A1 | 12/2021 |

OTHER PUBLICATIONS

Dutch Application No. NL2032507, Search Report mailed May 31, 2023, 7 pages.

U.S. Appl. No. 17/865,830, Office Action mailed Dec. 12, 2023, 58 pages.

U.S. Appl. No. 17/865,830, Notice of Allowance mailed Jul. 23, 2024, 14 pages.

* cited by examiner

SYSTEMS AND METHODS FOR MONITORING AND MANAGING REACTIVE POWER FROM HORTICULTURAL LIGHTING SOURCES IN AN ELECTRICAL GRID

TECHNICAL FIELD

The technical field generally relates to horticultural lighting, and more particularly concerns methods and systems for monitoring and managing reactive power from horticultural lighting sources in an electric grid.

BACKGROUND

Artificial light sources may be used in horticulture or agriculture to assist or promote the growth of plants or crops, which may be particularly useful in a horticultural structure such as a greenhouse.

The horticultural structures are generally equipped with a plurality of horticultural lighting apparatuses connected to an electrical grid. The operation of the horticultural lighting sources may have undesired impacts on the electrical grid.

There remains a need for systems and methods that can provide improvements in methods and systems for controlling horticultural lighting sources, as well as their potential undesirable effects in the electrical grid, especially in the context of horticultural structure including a relatively large number of horticultural lighting sources.

SUMMARY

The present techniques generally concern methods and systems for monitoring and managing reactive power from horticultural lighting sources in an electrical grid. The techniques provided herein include determining or predicting distortive effects produced by the horticultural lighting sources, evaluating a power factor of the horticultural light sources, and based on a target power factor, adjusting the power factor of the horticultural light sources. The techniques described herein allow for an optimization of the power factor of the horticultural lighting sources in order to reduce, mitigate or eliminate the negative effects generally associated with the operation of horticultural light sources on the electrical grid.

In accordance with one aspect, there is provided a system for monitoring and managing reactive power in an electrical grid, the system including:
  a plurality of horticultural light sources operatively connected to the electrical grid;
  a reactive power monitoring module operatively connected to the plurality of horticultural light sources, the reactive power monitoring module being configured to:
    determine or predict distortive effects produced by the plurality of horticultural light sources in the electrical grid; and
    send illumination instructions to the plurality of horticultural light sources in response to the determined or predicted distortive effects, the illumination instructions causing an increase of a power factor of at least one of the plurality of horticultural light sources.

In some embodiments, the distortive effects include at least one harmonic component.

In some embodiments, the distortive effects include at least one phase component.

In some embodiments, the increase is an effective increase of the power factor.

In some embodiments, the increase is an artificial increase of the power factor.

In accordance with another aspect, there is provided a method for monitoring and managing reactive power in an electrical grid, the method including:
  determining or predicting distortive effects produced by a plurality of horticultural light sources in the electrical grid with a reactive power monitoring module; and
  providing illumination instructions to the plurality of horticultural light sources in response to the determined or predicted distortive effects, the illumination instructions causing an increase of a power factor of at least one of the plurality of horticultural light sources; and
  driving the plurality of horticultural light sources according to the illumination instructions.

In some embodiments, the distortive effects include at least one harmonic component.

In some embodiments, the distortive effects include at least one phase component.

In some embodiments, the increase is an effective increase of the power factor.

In some embodiments, the increase is an artificial increase of the power factor.

In accordance with another aspect, there is provided a system for monitoring and managing reactive power in an electrical grid, the system including:
  a plurality of horticultural light sources operatively connected to the electrical grid, each horticultural light source including a plurality of light-emitting diodes;
  a reactive power monitoring module operatively connected to the plurality of horticultural light sources, the reactive power monitoring module being configured to:
    determine a power factor associated with the light-emitting diodes of the plurality of horticultural lighting sources;
    compare the determined power factor with a target power factor; and
    produce a control signal, the control signal being sent towards the light-emitting diodes for driving the same, the control signal causing an adjustment of the power factor of at least one of the plurality of horticultural light sources to meet the target power factor.

In some embodiments, the reactive power monitoring module is further configured to receive inputs representative of measured data.

In some embodiments, the reactive power monitoring module is further configured to receive inputs representative of estimated data.

In some embodiments, the distortive effects include at least one harmonic component.

In some embodiments, the distortive effects include at least one phase component.

In some embodiments, the adjustment of the power factor is an effective increase of the power factor.

In some embodiments, the adjustment is an artificial increase of the power factor.

In accordance with another aspect, there is provided a method for monitoring and managing reactive power from horticultural lighting sources in an electrical grid, each horticultural lighting source including a plurality of light-emitting diodes, the method including:
  determining a power factor associated with the light-emitting diodes of the plurality of horticultural lighting sources with a reactive power monitoring module;

comparing the determined power factor with a target power factor with the reactive power monitoring module; and producing a control signal, the control signal being sent towards the light-emitting diodes for driving the same, the control signal causing an adjustment of the power factor of at least one of the plurality of horticultural light sources to meet the target power factor.

In some embodiments, the method, further includes receiving inputs representative of measured data.

In some embodiments, the method, further includes receiving inputs representative of estimated data.

In some embodiments, the distortive effects include at least one harmonic component.

In some embodiments, the distortive effects include at least one phase component.

In some embodiments, the adjustment is an effective increase of the power factor.

In some embodiments, the adjustment is an artificial increase of the power factor.

In accordance with another aspect, there is provided a system for monitoring and managing reactive power in an electrical grid, the system including:

a plurality of horticultural light sources operatively connected to the electrical grid, each horticultural light source being associated with at least one dedicated power supply, the at least one dedicated power supply having an on state and an off state, each horticultural light source including a plurality of light-emitting diodes;

a reactive power monitoring module operatively connected to the plurality of horticultural light sources, the reactive power monitoring module being configured to:

determine a power factor associated with the light-emitting diodes of the plurality of horticultural lighting sources;

compare the determined power factor with a target power factor; and produce a control signal, the control signal being sent towards the at least one dedicated power supply of at least one of the plurality of horticultural light sources to switch from the on state to the off state or from the off state to the on state, thereby causing an adjustment of the power factor of at least one of the plurality of horticultural light sources to meet the target power factor.

In some embodiments, the reactive power monitoring module is further configured to receive inputs representative of measured data.

In some embodiments, the reactive power monitoring module is further configured to receive inputs representative of estimated data.

In some embodiments, the distortive effects include at least one harmonic component.

In some embodiments, the distortive effects include at least one phase component.

In some embodiments, the adjustment of the power factor is an effective increase of the power factor.

In some embodiments, the adjustment is an artificial increase of the power factor.

In accordance with another aspect, there is provided a method for monitoring and managing reactive power from horticultural lighting sources in an electrical grid, each horticultural lighting source including a plurality of light-emitting diodes and at least one dedicated power supply, each dedicated power supply having an on state and an off state, the method including:

determining a power factor associated with the light-emitting diodes of the plurality of horticultural lighting sources;

comparing the determined power factor with a target power factor; and producing a control signal, the control signal being sent towards the at least one dedicated power supply of at least one of the plurality of horticultural light sources to switch from the on state to the off state or from the off state to the on state, thereby causing an adjustment of the power factor of at least one of the plurality of horticultural light sources to meet the target power factor.

In some embodiments, the method further includes receiving inputs representative of measured data.

In some embodiments, the method further includes receiving inputs representative of estimated data.

In some embodiments, the distortive effects include at least one harmonic component.

In some embodiments, the distortive effects include at least one phase component.

In some embodiments, the adjustment is an effective increase of the power factor.

In some embodiments, the adjustment is an artificial increase of the power factor.

In accordance with another aspect, there is provided a system for monitoring and managing reactive power in an electrical grid, the system including:

a plurality of horticultural light sources operatively connected to the electrical grid;

an estimation module operatively connected to the plurality of horticultural light sources, the estimation module being configured to receive a first set of inputs, the first set of inputs being representative of a power usage profile and a spectral density distribution of each of the horticultural light source, the estimation module being further configured to output an estimation of an anticipated power factor;

a decision module in data communication with the estimation module and being operatively connected to the plurality of horticultural light sources, the decision module being configured to receive the estimation of the anticipated power factor and a second set of inputs, the second set of inputs being representative of a rule associated with a target power factor, the decision module being further configured to produce a control signal, based on a comparison between the anticipated power factor and the target power factor, and send the control signal towards the plurality of horticultural light sources, the control signal causing an adjustment of the anticipated power factor of the plurality of horticultural light sources to meet the target power factor; and a visualization module in data communication with the estimation module and the decision module, the visualization module being configured to display at least one of the first set of inputs, the second set of inputs, the estimation of the anticipated power factor and the target power factor.

In accordance with another aspect, there is provided a method for monitoring and managing reactive power from a plurality of horticultural lighting sources in an electrical grid, the method including:

obtaining a first set of inputs with an estimation module, the first set of inputs being representative of a power usage profile and a spectral density distribution of each of the horticultural light source;

estimating an anticipated power factor with the estimation module;

obtaining, with a decision module in data communication with the estimation module, the estimation of the anticipated power factor and a second set of inputs, the second set of inputs being representative of a rule associated with a target power factor;

based on a comparison between the anticipated power factor and the target power factor, producing a control signal with the decision module; and driving the plurality of horticultural light sources according to the control signal, the control signal causing an adjustment of the anticipated power factor of the plurality of horticultural light sources to meet the target power factor.

In accordance with another aspect, there is provided a non-transitory computer readable storage medium having stored thereon computer executable instructions that, when executed by a processor, cause the processor to perform the methods herein disclosed, or at least one step of the method.

Other features and advantages of the method and system described herein will be better understood upon a reading of preferred embodiments thereof with reference to the appended drawings. Although specific features described in the above summary and in the detailed description below may be described with respect to specific embodiments or aspects, it should be noted that these specific features can be combined with one another unless stated otherwise.

DETAILED DESCRIPTION

Figure 1:
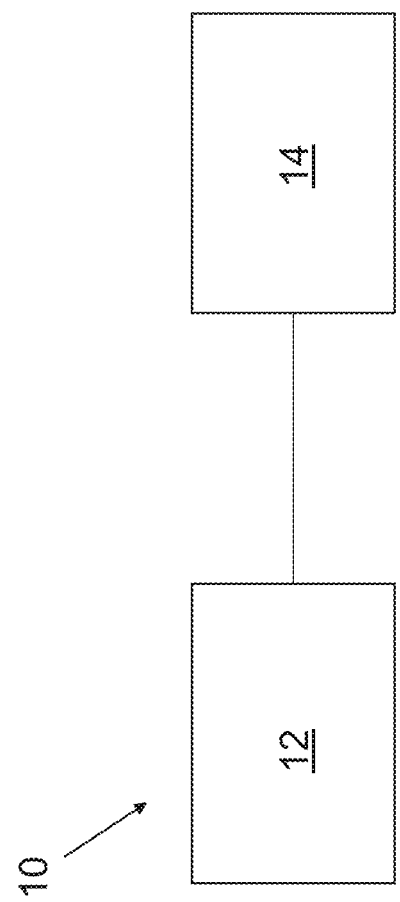
FIG. 1 illustrates a system for monitoring and managing reactive power in an electrical grid, in accordance with one embodiment.

In the present description, similar features in the drawings have been given similar reference numerals. To avoid cluttering certain figures, some elements may not have been indicated if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. More particularly, it will be understood that such spatially relative terms are intended to encompass different orientations in the use or operation of the present embodiments, in addition to the orientations exemplified in the figures.

The terms "a", "an" and "one" are defined herein to mean "at least one", that is, these terms do not exclude a plural number of items, unless stated otherwise.

Terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application.

Unless stated otherwise, the terms "connected" and "coupled", and derivatives and variants thereof, refer herein to any structural or functional connection or coupling, either direct or indirect, between two or more elements. For example, the connection or coupling between the elements may be acoustical, mechanical, optical, electrical, thermal, logical, or any combinations thereof.

The terms "match", "matching" and "matched" are intended to refer herein to a condition in which two elements are either the same or within some predetermined tolerance of each other. That is, these terms are meant to encompass not only "exactly" or "identically" matching the two elements but also "substantially", "approximately" or "subjectively" matching the two elements, as well as providing a higher or best match among a plurality of matching possibilities.

In the present description, the expression "based on" is intended to mean "based at least partly on", that is, this expression can mean "based solely on" or "based partially on", and so should not be interpreted in a limited manner. More particularly, the expression "based on" could also be understood as meaning "depending on", "representative of", "indicative of", "associated with" or similar expressions.

The term "computer" (or "computing device") is used to encompass computers, servers and/or specialized electronic devices which receive, process and/or transmit data. Computers are generally part of "systems" and include processing means, such as microcontrollers and/or microprocessors, CPUs or are implemented on FPGAs, as examples only. The processing means are used in combination with storage medium, also referred to as "memory" or "storage means". Storage medium can store instructions, algorithms, rules and/or data to be processed. Storage medium encompasses volatile or non-volatile/persistent memory, such as registers, cache, RAM, flash memory, ROM, as examples only. The type of memory is, of course, chosen according to the desired use, whether it should retain instructions, or temporarily store, retain or update data.

One skilled in the art will therefore understand that each such computer typically includes a processor (or multiple processors) that executes program instructions stored in the memory or other non-transitory computer-readable storage medium or device (e.g., solid state storage devices, disk drives, etc.). The various functions, modules, services, units or the like disclosed hereinbelow can be embodied in such program instructions, and/or can be implemented in application-specific circuitry (e.g., ASICs or FPGAs) of the computers. Where a computer system includes multiple computers these devices can, but need not, be co-located. In some embodiments, a computer system can be a cloud-based computing system whose processing resources are shared by multiple distinct business entities or other users.

It should be noted that, in the context of the current disclosure, the expression "plants or crops" may encompass a broad variety of multicellular organisms, including photosynthetic eukaryotes. Non limitative examples of plants or crops are seedlings, ornamental crops, ornamental plants, plugs, liners, fruits, small fruits, vegetables, leafy greens, herbs, young plants, high-value crops, and many others. The plants or crops may be produced for human food, non-human food or non-food applications. The growing process of the plants or crops generally includes a plurality of subsequent plant growth stages, such as, for example, seed germination (or "sprout"), seedling, vegetative, bud stage (or "budding"), flowering and ripening. It should be understood that, in the present description, the plants or crops can be at any one of the plant growth stages or at a transition between any two subsequent growth stages.

The expression "horticultural light", synonyms and derivatives thereof will be used throughout the present disclosure, and refers to the use of optical techniques, systems, and methods for assisting, maintaining, stimulating and/or optimizing plants or crops growth. The horticultural light may irradiate or illuminate the plants or crops during any one of the plant growth stages. The horticultural light, which is the light generated by the horticultural lighting apparatus, may be produced or generated using an artificial light source or similar devices, apparatuses, and systems. Non-limiting examples of artificial light sources include incandescent light sources, fluorescent light sources, high-intensity discharge (HID) light sources such as mercury vapor, metal halide (MH), high-pressure sodium (HPS) and low-pressure sodium (LPS) light sources, solid-state light sources including LED light sources, and laser sources. The horticultural light is associated with an illumination spectrum or profile. In some implementations, the horticultural light produced by the horticultural lighting apparatus have a profile substantially similar to light reaching the crop or plant. The expression "illumination spectrum" is used to broadly refer to the spectral power distribution of an illumination. The illumination spectrum can represent the distribution of power radiated per unit area and per unit wavelength or frequency over a spectral region of the electromagnetic spectrum. It should be noted that using horticultural light may be used to irradiate or illuminate plants or crops growing in a horticultural structure providing regulated climatic conditions to the plants or crops. Non-limitative examples of horticultural structures include greenhouse, glasshouse and hothouse.

In the present description, the terms "light" and "optical", and variants and derivatives thereof, are used to refer to radiation in any appropriate region of the electromagnetic spectrum. The terms "light" and "optical" are therefore not limited to visible light, but can also include, without being limited to, the infrared and ultraviolet regions. For example, in some implementations, the present techniques can be used with electromagnetic signals having wavelengths ranging from about 250 nm to about 2500 nm. However, this range is provided for illustrative purposes only and some implementations of the present techniques may operate outside this range. Also, the skilled person will appreciate that the definition of the ultraviolet, visible and infrared ranges in terms of spectral ranges, as well as the dividing lines between them, can vary depending on the technical field or the definitions under consideration, and are not meant to limit the scope of applications of the present techniques.

The expressions "natural light" or "natural light conditions" generally refer to light having spectral characteristics corresponding or similar to those of sunlight, moonlight or starlight. The spectral profile of natural light, particularly sunlight, varies as a function of geographic location, time of day, time of year, weather, cloud coverage, and several other factors. Several standards are known in the art to provide a spectral reference for natural light. For example, the Commission internationale de l'éclairage (CIE) has established the D series of well-defined daylight standard illuminants representing natural light under different conditions. One well-known standard is CIE Standard Illuminant D65, which is a daylight illuminant that intends to represent the average midday light in Western or Northern Europe. Other examples of CIE Standard Illuminants for daylight include the D50, D55, and D75 standard illuminants. Sunlight, which refers to the total spectrum of electromagnetic radiation emitted by the Sun and reaching the Earth, has a broad spectral range including ultraviolet radiation, visible light, and infrared radiation. Accordingly, standard illuminants extend within the solar radiation spectrum. For example, Standard Illuminant D65 extends from 300 nm to 830 nm. Non-limiting examples of natural light sources include sunlight, moonlight, starlight, twilight, lightning, and firelight.

In the present description, the term "solid-state light emitter" refers to any light-emitting device that converts electrical energy into electromagnetic radiation through the recombination of electronic carriers (i.e., electrons and holes) in a light emitting layer or region. The emitting layer or region can include, but is not limited to, silicon, silicon carbide, gallium nitride and/or other semiconductor materials, and may or may not include a substrate such as sapphire, silicon, silicon carbide and/or other microelectronic substrates. The solid-state light emitters can include both inorganic and organic light emitters, many of which are known to the skilled person and need not be described in detail herein. Non-limiting examples of types of solid-state light emitters include semiconductor light-emitting diodes (LEDs), semiconductor laser diodes, vertical cavity surface emitting lasers (VCSELs), other semiconductor light emitting devices or lamps, organic light-emitting diodes (OLEDs), and polymer light-emitting diode (PLEDs).

The expression "lighting scenario" is understood to refer to the generation of light, such as for illuminating purposes, according to predetermined optical characteristics (e.g., spectral content, intensity, polarization) that vary or evolve over time during a given time period. The optical characteristics of the generated light may correspond to or emulate those of natural lighting conditions. The natural light may emulate or be inspired from the actual light conditions experienced at a specific geographical location, date and time. It is appreciated that devising lighting scenarios that combine natural light conditions corresponding to different geographical locations is possible in some applications (e.g., a scenario could be build using sunrise, midday and sunset conditions corresponding to three distinct locations on Earth, at the same or different dates). In other embodiments, however, the natural light conditions may be different from real life conditions on Earth. By way of example, the spectrum of natural light generated according to the method described herein may differ from an actual spectral content of sunlight due to the absence of spectral components which are undesired or unnecessary in a given application context, or conversely by the enhancement or addition of wavelengths then are considered advantageous or required. The present techniques may rely on the use of solid-state light emitters. The solid-state light emitters can be driven to produce the lighting scenario using sets of control parameters. It should be noted that a plurality of lighting scenarios may be combined to collectively determine a "recipe" or a "recipe bundle". The recipe or the recipe bundle refers to a sequence of lighting scenarios.

In some embodiments, the lighting scenario may emulate lighting conditions over the course of a day, from dawn to dusk, or over a portion of a day. Indeed, the spectral contents of light reaching a particular location on earth from the Sun is not constant as the day progress. In some instances, it can be customary to characterize natural light according to its Correlated Color Temperature (CCT) value, expressed in Kelvin (K). By convention, the CCT is defined by the CIE as "the temperature of the Planckian radiator whose perceived color most closely resembles that of a given stimulus at the same brightness and under specified viewing conditions" (CIE/IEC 17.4:1987, International Lighting Vocabulary). Lower CCT values correspond to "warmer" light. Hence, a day with a clear blue sky can begin at dawn with light in a warm CCT spectrum range, such as between 1500K and 3000K, then progress to about 5000K to 7500K at mid-day and return to the 1500K to 3000K range towards dusk. In horticultural or agricultural applications, the light conditions in a region of the world from which a cultivated produce originates or where this produce is known to thrive can be emulated (e.g., growing tomatoes using light conditions from a sunny day in June in Tuscany). In other examples, the lighting conditions may be adapted in view of observations or discoveries regarding optimal or enhanced lighting conditions for growing a given agricultural output, such as for example to follow the McCree Curve, which represents the average photosynthetic response of plants to light energy.

The expression "adverse effects" will be used throughout the current disclosure to refer to potentially negative, unwanted and/or undesired impacts in the electrical grid that may be caused by the operation of the horticultural light sources. Nonlimitative examples of adverse effects include distortive effects, which may be caused by harmonics generated by the horticultural light sources or components thereof, and shifting effects, which may be caused by nonlinearities load of the horticultural light sources or components thereof.

The expression "power factor" refers to a property of an AC system and may be defined as a ratio of a power absorbed by the load (i.e., the "real" power) to a power flowing in the circuit (i.e., the "apparent" power). The power factor is represented by a dimensionless number in the closed interval extending from −1 to 1. The voltage and current are in phase when the power is 1 and −1. In between, they are not in phase. A power factor of less than 1 and higher than −1 means that the voltage and current are not in phase in the AC system.

The present description generally relates to methods and systems for monitoring and managing reactive power from horticultural lighting sources in an electrical grid. Broadly described, the techniques provided herein include determining or predicting distortive effects produced by the horticultural lighting sources, evaluating a power factor of the horticultural light sources, and based on a target power factor, adjusting the power factor of the horticultural light sources. The techniques described herein allow for an optimization of the power factor of the horticultural lighting sources in order to reduce, mitigate or eliminate the negative effects generally associated with the operation of horticultural light sources within a horticultural structure.

System and Method for Monitoring and Managing Reactive Power

With reference to FIG. 1, there is provided a system 10 for monitoring and managing reactive power from horticultural lighting sources in an electrical grid. Broadly described, the system includes a plurality of horticultural light sources 12 (globally referred to as the "horticultural light sources") and a reactive power monitoring module 14.

The horticultural light sources 12 are operatively connected to the electrical grid. The expression "electrical grid" will be used throughout the description to refer to an interconnected network configured to deliver electricity from an electricity-generating facility towards a consumption point. The electricity-generating facility may be referred to as a power station, a power plant, a generating station, or a generating plant. The consumption point may be of various types and configurations and may for example be embodied by a horticultural structure or a plurality of interconnected horticultural structures.

In some embodiments, the horticultural light sources 12 may be embodied by a lamp similar to the lighting system described in WO 2016119063, the content of which is incorporated herein by reference.

The reactive power monitoring module 14 is operatively connected to the horticultural light sources 12. The reactive power monitoring module 14 may include or be operatively connected to one or more controller(s) or processor(s), configured to perform a series of steps that will be described in greater detail later.

The reactive power monitoring module 14 is configured to determine or predict distortive effects produced by the plurality of horticultural light sources 12 in the electrical grid. In some embodiments, the distortive effects include at least one harmonic component and/or at least one phase component.

Harmonics are a distortion of current waveforms in the electrical grid that may be associated with the non-linear load of the horticultural light sources 12 or components thereof. The load may change with a variation of at least one characteristic of the horticultural light being generated by the horticultural light sources 12, such as, for example, the spectral profile of the horticultural light. The deformation or distortion of the current waveforms is also associated with a voltage distortion. These distortions have a negative impact on the electrical grid, and it is an objective of the current technology to determine or predict potential distortive effects that could be caused by the horticultural light sources 12, and in response thereto, adjust the operation of the horticultural light sources 12 to mitigate, reduce or potentially eliminate these distortive effects.

The phase component mentioned above may be described as a shifting effect caused by an inductive load (e.g., transformers) and a capacitive load (e.g., electronic components). When the shifting effect is observed, the current and voltage are not in phase, i.e., the current does not follow adequately the voltage.

The reactive power monitoring module 14 is also configured to send illumination instructions to horticultural light sources 12 in response to the determined or predicted distortive effects. The illumination instructions cause an increase of a power factor of at least one of the horticultural light sources 12. As such, the reactive power monitoring module 14 can determine or predict a power factor associated with the horticultural light sources 12 and compare the determined or predicted power factor with a target power factor. If the determined or predicted power factor falls outside a predetermined interval associated with the target power factor, then the reactive power monitoring module 14 will send illumination instructions to the horticultural light sources 12 to cause an adjustment of the power factor to meet the target power factor. The adjustment of the power factor may be, in some embodiments, an effective increase of the power factor. In other embodiments, the adjustment may be an artificial increase of the power factor.

There is also provided a method for monitoring and managing the reactive power in the electrical grid. Broadly described, the method includes a step of determining or predicting distortive effects produced by the horticultural light sources in the electrical grid. This step may be achieved with the reactive power monitoring module having been described above. The method also includes a step of providing illumination instructions to the horticultural light sources in response to the determined or predicted distortive effects. As previously described, the illumination instructions cause an increase of the power factor of at least one of the horticultural light sources. The method also includes a step of driving the horticultural light sources according to the illumination instructions. It should be noted that at least some of the steps having been described may be simultaneously, concurrently, subsequently or sequentially performed.

In some embodiments, the distortive effects include at least one harmonic component and/or least one phase component.

In some embodiments, the increase is an effective increase of the power factor and/or an artificial increase of the power factor.

Now that the technology has been broadly described, three classes of embodiments will now be presented.

First Class of Embodiments: LEDs Control

Figure 2:
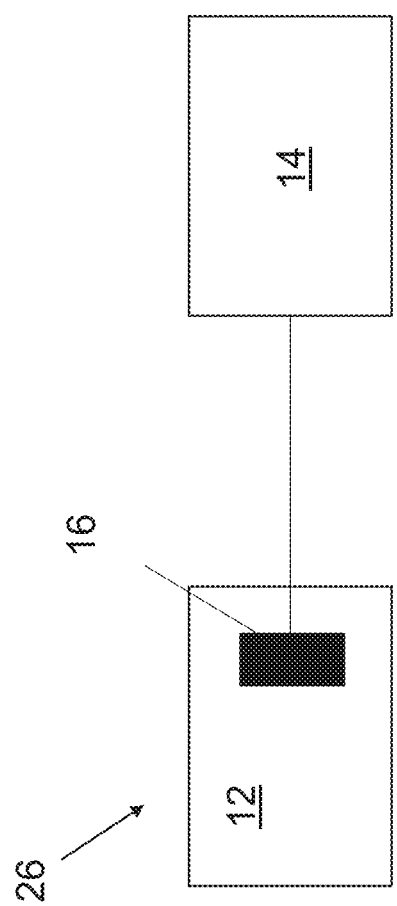
FIG. 2 illustrates a system for monitoring and managing reactive power in an electrical grid, in accordance with another embodiment.

The first class of embodiments, an example of which is illustrated in FIG. 2, relates to a system 26 allowing a control of the LEDs 16 (or solid-state emitters) included in the horticultural light sources 12.

The LEDs 16 represent a significant portion of the power consumption of the horticultural light sources 12. In horticultural light sources 12 having an adjustable spectral power distribution (SPD), the power consumed by the LEDs 16 may change according to the spectral profile required to obtain a predetermined SPD. The power consumed by each LED 16 affects the overall power factor of the horticultural light sources 12. As there is a correlation between the target SPD, the LEDs power consumption and the horticultural light sources 12 power consumption, it is possible to estimate, predict and/or measure the power consumption of the horticultural light sources 12 from the LEDs 16 power consumption.

In some embodiments, the LEDs 16 power consumption may be estimated. Estimating the LEDs 16 power consumption includes obtaining the horticultural light sources 12 power consumption profile and, based on that information, estimating the LEDs 16 power consumption for a predetermined SPD.

In some embodiments, the LEDs 16 power consumption may be measured. The measurement includes using a power measurement circuit, which may for example be provided on the horticultural light sources 12. The power measurement circuit is configured to measure in real time or near real time the LEDs 16 power consumption.

The system 26 allowing the LEDs control includes the horticultural light sources 12 having been previously described.

The system 26 according to the first class of embodiments also includes a reactive power monitoring module 14 operatively connected to the horticultural light sources 12. The reactive power monitoring module 14 is configured to determine a power factor associated with the LEDs 16 of the horticultural lighting sources 12. As previously mentioned, the determination of the power factor may be an estimation or a measurement. The reactive power monitoring module 14 is also configured to compare the determined power factor with a target power factor and produce a control signal. The control signal is then sent towards the LEDs 16 to allow their control. The control signal causes an adjustment of the power factor of at least one of the horticultural light sources 12 to meet the target power factor. In some embodiments, the reactive power monitoring module 14 is further configured to receive inputs representative of measured data and/or estimated data.

There is also a method associated with the first class of embodiments. The method includes determining a power factor associated with the LEDs of the horticultural lighting sources with a reactive power monitoring module. The method also includes comparing the determined power factor with a target power factor. This comparison may be performed by the reactive power monitoring module. The method also includes producing a control signal and sending the control signal towards the LEDs for driving the same. The control signal causes an adjustment of the power factor of at least one of the horticultural light sources to meet the target power factor.

In some embodiments, the distortive effects include at least one harmonic component and/or at least one phase component. In some embodiments, the adjustment of the power factor is an effective increase of the power factor and/or an artificial increase of the power factor.

In some embodiments, the reactive power monitoring module can be used to track or monitor an ongoing power factor, but also to identify past, present, and/or predicted power factor for a given lighting scenario or portion thereof. The power factors may be stored in the reactive power monitoring module or in a separated memory and remain accessible to the reactive power monitoring module for future reference.

In some embodiments, the methods and systems may include detecting of one or more signals representative of the horticultural environment. For example, the signals may be representative of changing climatic conditions in the horticultural environment and adjusting the power factor based on the signals representative of the horticultural environment.

Second Class of Embodiments: Power Supply Control

Figure 3:
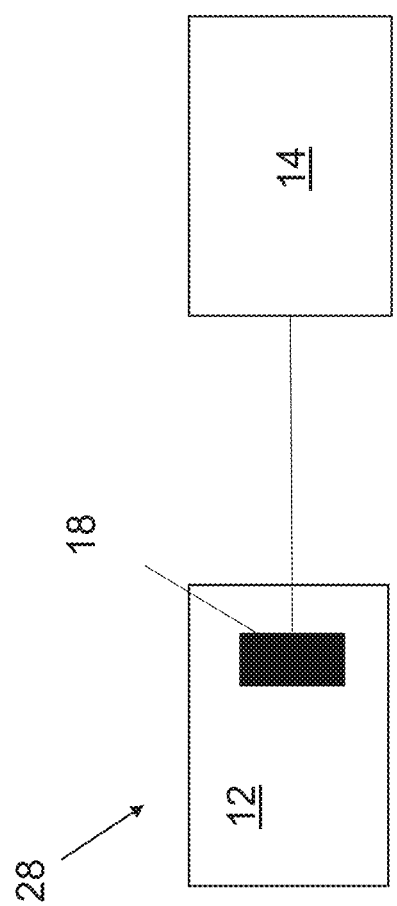
FIG. 3 illustrates a system for monitoring and managing reactive power in an electrical grid, in accordance with another embodiment.

The second class of embodiments, an example of which is illustrated in FIG. 3, relates to a control of the power supplies 18 associated with the horticultural light sources 12.

The system 28 allowing the power supplies 18 control includes the horticultural light sources 12 have been previously described. Each horticultural light source 12 is associated with at least one dedicated power supply 18. The dedicated power supply 18 has an "on" state and an "off" state. In some embodiments, the dedicated power supply 18 may have a "stand-by" state (sometimes referred to a "stand-by" mode). In some embodiments, each horticultural light source 12 includes one dedicated power supply 18. In other embodiments, each horticultural light source 12 includes a plurality of dedicated power supplies 18.

The system 28 according to the second class of embodiments also includes a reactive power monitoring module 14 operatively connected to the horticultural light sources 12. The reactive power monitoring module 14 is configured to determine a power factor associated with the LEDs of the horticultural lighting sources. Of note, the power factor may be determined, estimated, calculated, measured or any combinations thereof. In addition, the expression "power factor" encompasses the power factor of the whole horticultural structure (e.g., a greenhouse), individual LED, a combination of LEDs (i.e., a "group" of LEDs that may or may not have similar optical and/or electrical properties), a horticultural light source 12 (e.g., a lamp), a combination of horticultural light sources 12 (i.e., a "group" of horticultural light sources 12 that may or may not have similar optical and/or electrical properties), and the like. The reactive power monitoring module 14 is also configured to compare the determined power factor with a target power factor. The reactive power monitoring module 14 is also configured to produce a control signal. The control signal is sent towards the at least one dedicated power supply 18 of at least one of the horticultural light sources 12 to switch from the on state to the off state or from the off state to the on state, thereby causing an adjustment of the power factor of at least one of the plurality of horticultural light sources 12 to meet the target power factor.

There is also a method associated with the second class of embodiments. The method includes determining a power factor associated with the LEDs of the horticultural lighting sources. The method also includes comparing the determined power factor with a target power factor. The method also includes producing a control signal. The control signal is sent towards the at least one dedicated power supply of at least one of the horticultural light sources to switch from the on state to the off state or from the off state to the on state, thereby causing an adjustment of the power factor of at least one of the horticultural light sources to meet the target power factor.

In some embodiments, the method further includes receiving inputs representative of measured data and/or estimated data.

In some embodiments, the distortive effects include at least one harmonic component and/or at least one phase component. In some embodiments, the adjustment of the power factor is an effective increase of the power factor and/or an artificial increase of the power factor.

Third Class of Embodiments: Estimation Module and Decision Module

Figure 4:
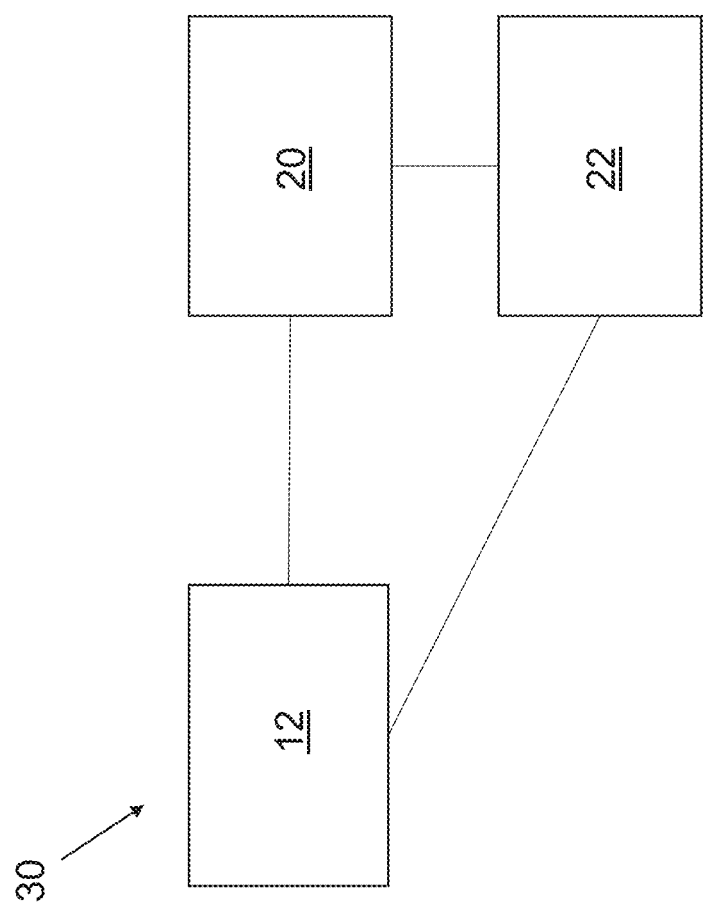
FIG. 4 illustrates a system for monitoring and managing reactive power in an electrical grid, in accordance with another embodiment.

The third class of embodiments, an example of which is illustrated in FIG. 4, relates to systems and methods using an estimation module 20 and a decision module 22.

More specifically, a system 30 representative of the third class of embodiments includes a plurality of horticultural light sources 12 operatively connected to an electrical grid.

The system 30 also includes an estimation module 20 operatively connected to the plurality of horticultural light sources 12. The estimation module 20 is configured to receive a first set of inputs. The first set of inputs is representative of a power usage profile and/or a spectral density distribution of each of the horticultural light sources 12. The estimation module 20 is also configured to output an estimation of an anticipated power factor.

The system 30 also includes a decision module 22 in data communication with the estimation module 20 and operatively connected to the plurality of horticultural light sources 12. The decision module 22 is configured to receive the estimation of the anticipated power factor and a second set of inputs. The second set of inputs is representative of a rule associated with a target power factor. The decision module 22 is also configured to produce a control signal, based on a comparison between the anticipated power factor and the target power factor. The control signal is then sent towards the plurality of horticultural light sources 12 and causes an adjustment of the anticipated power factor of the plurality of horticultural light sources 12 to meet the target power factor.

The system 30 also includes a visualization module 24 in data communication with the estimation module 20 and the decision module 22. The visualization module 24 is configured to display at least one of the first set of inputs, the second set of inputs, the estimation of the anticipated power factor and the target power factor.

In some embodiments, the estimation module 20 and the decision module 22 collectively form the reactive power module, embodiments of which have been previously described. In other embodiments, the estimation module 20 and the decision module 22 are sub-modules of the reactive power monitoring module. In yet other embodiments, the reactive power monitoring module, the estimation module 20, and the decision module 22 are separated modules. In this configuration, the reactive power monitoring module, the estimation module 20, and the decision module 22 are interconnected.

There is also provided a method associated with the third class of embodiments. The method includes obtaining a first set of inputs with an estimation module, the first set of inputs being representative of a power usage profile and a spectral density distribution of each of the horticultural light source. The method also includes estimating an anticipated power factor with the estimation module. The method also includes obtaining, with a decision module in data communication with the estimation module, the estimation of the anticipated power factor and a second set of inputs, the second set of inputs being representative of a rule associated with a target power factor. The method also includes producing a control signal with the decision module, based on a comparison between the anticipated power factor and the target power factor. The method also includes driving the plurality of horticultural light sources according to the control signal, the control signal causing an adjustment of the anticipated power factor of the plurality of horticultural light sources to meet the target power factor.

In some embodiments, the method further includes receiving inputs representative of measured data and/or estimated data.

In some embodiments, the distortive effects include at least one harmonic component and/or at least one phase component. In some embodiments, the adjustment of the power factor is an effective increase of the power factor and/or an artificial increase of the power factor.

In some embodiments, some steps of the proposed methods are implemented as software instructions and algorithms, stored in computer memory and executed by processors. It should be understood that computers are therefore required to implement to proposed system, and to execute the proposed method. In other words, the skilled reader will readily recognize that steps of various above-described methods can be performed by programmed computers. In view of the above, some embodiments are also intended to cover program storage devices, e.g., digital data storage media, which are machine or computer readable and encode machine-executable or computer-executable programs of instructions, wherein said instructions perform some or all of the steps of said above-described methods. The embodiments are also intended to cover computers programmed to perform said steps of the above-described methods.

In some embodiments, the transmission of the signals between the modules or components of the systems having been described may rely on different protocols and methods. For example, and without being limitative, the protocols and methods may involve internet communications, streaming, cloud storage, private network, server(s), and/or any combinations thereof. In some embodiments, the signals being sent and/or received by modules or components of the systems having been described may be standardized or meet the requirements of any relevant norms. It should be noted that the expression "signals" also encompass the illumination instructions and the control signals having been herein described.

In accordance with another aspect of the present description, there is provided a non-transitory computer readable storage medium having stored thereon computer executable instructions that, when executed by a processor, cause the processor to perform the methods that have been previously described. The non-transitory computer storage medium can be integrated to the systems or assemblies that have been described in the present description. The non-transitory computer storage medium could otherwise be operatively connected with the systems or assemblies. In the present description, the terms "computer readable storage medium" and "computer readable memory" are intended to refer to a non-transitory and tangible computer product that can store and communicate executable instructions for the implementation of various steps of the method disclosed herein. The computer readable memory can be any computer data storage device or assembly of such devices, including random-access memory (RAM), dynamic RAM, read-only memory (ROM), magnetic storage devices such as hard disk drives, solid state drives, floppy disks and magnetic tape, optical storage devices such as compact discs (CDs or CDROMs), digital video discs (DVD) and Blu-Ray™ discs; flash drive memory, and/or other non-transitory memory technologies. A plurality of such storage devices may be provided, as can be understood by those skilled in the art. The computer readable memory may be associated with, coupled to, or included in a computer or processor configured to execute instructions contained in a computer program stored in the computer readable memory and relating to various functions associated with the computer.

Examples

Figure 5:
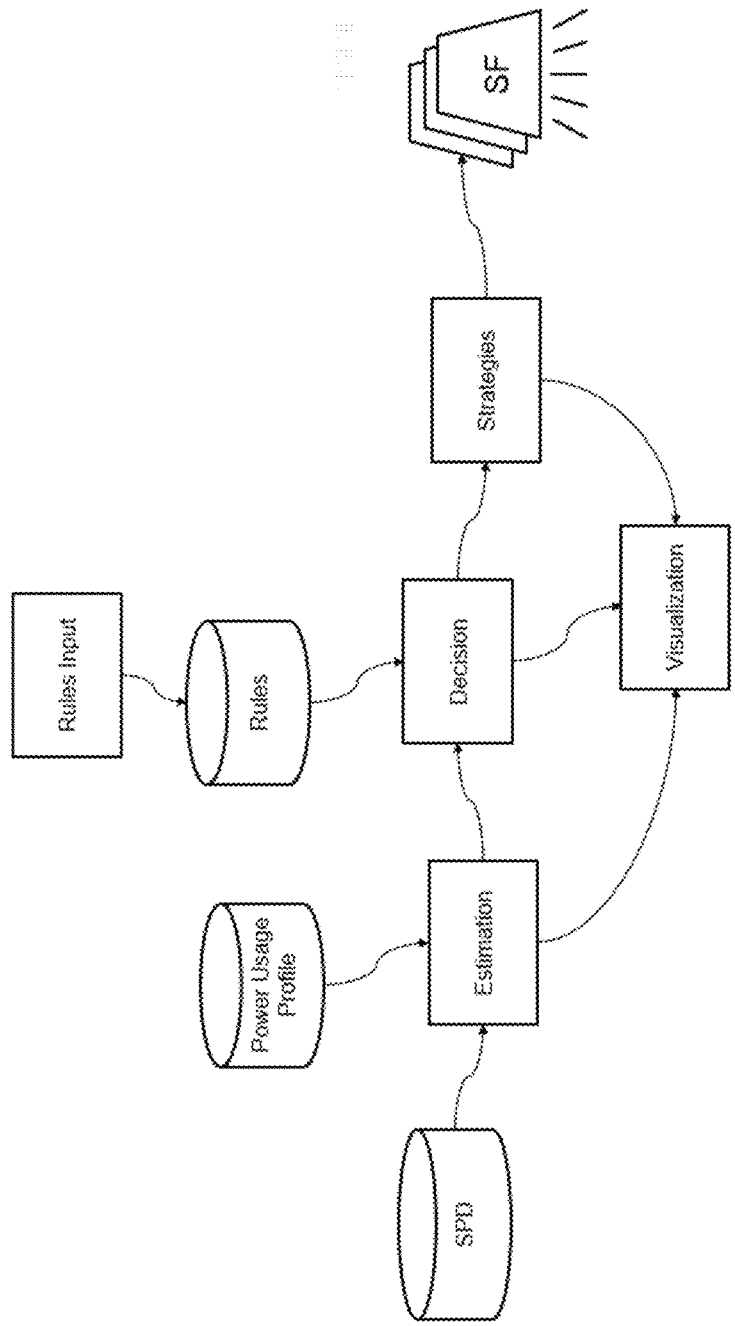
FIG. 5 shows an example of an implementation of the techniques herein disclosed.
Figure 6:
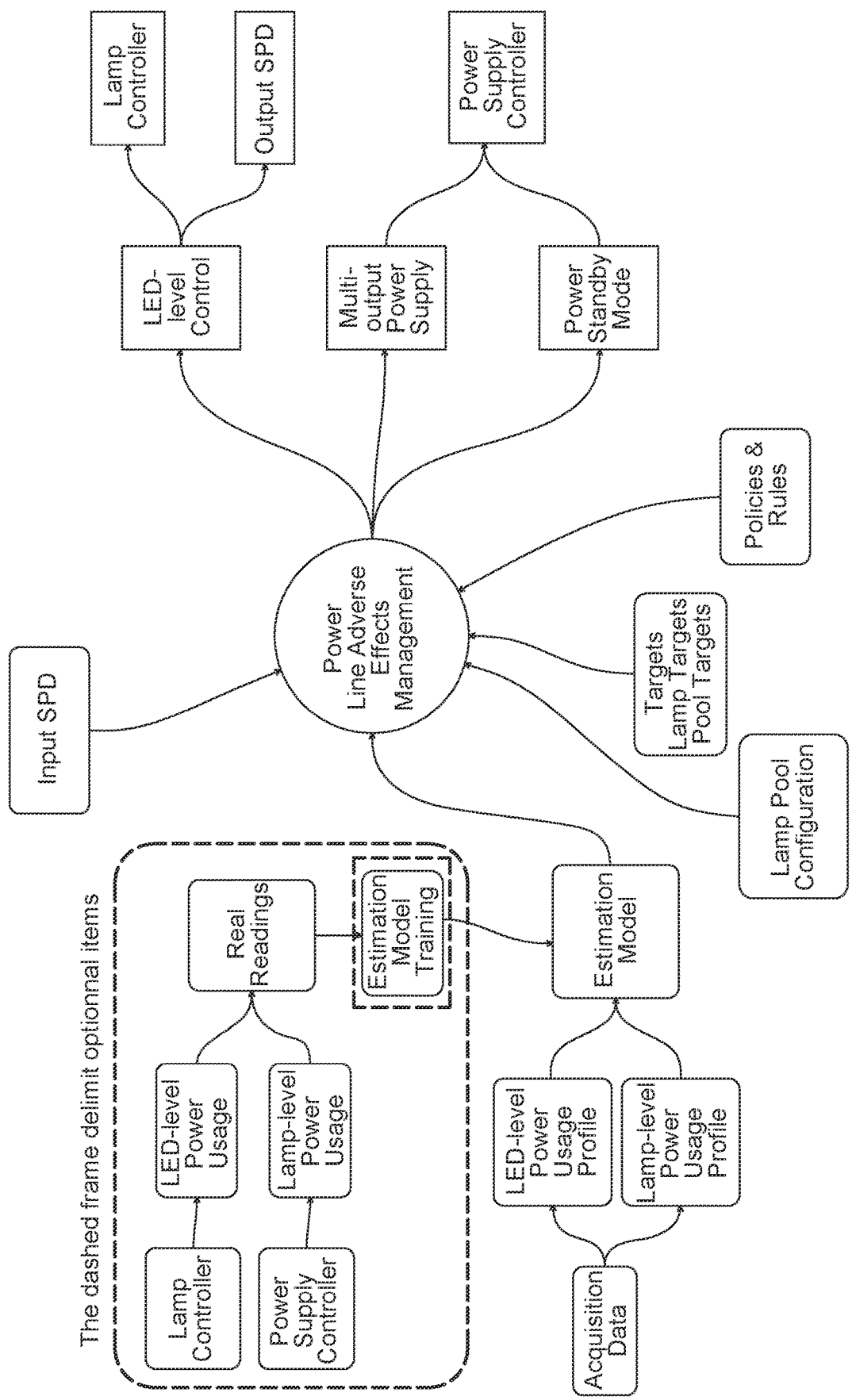
FIG. 6 shows another example of an implementation of the techniques herein disclosed.
Figure 7:
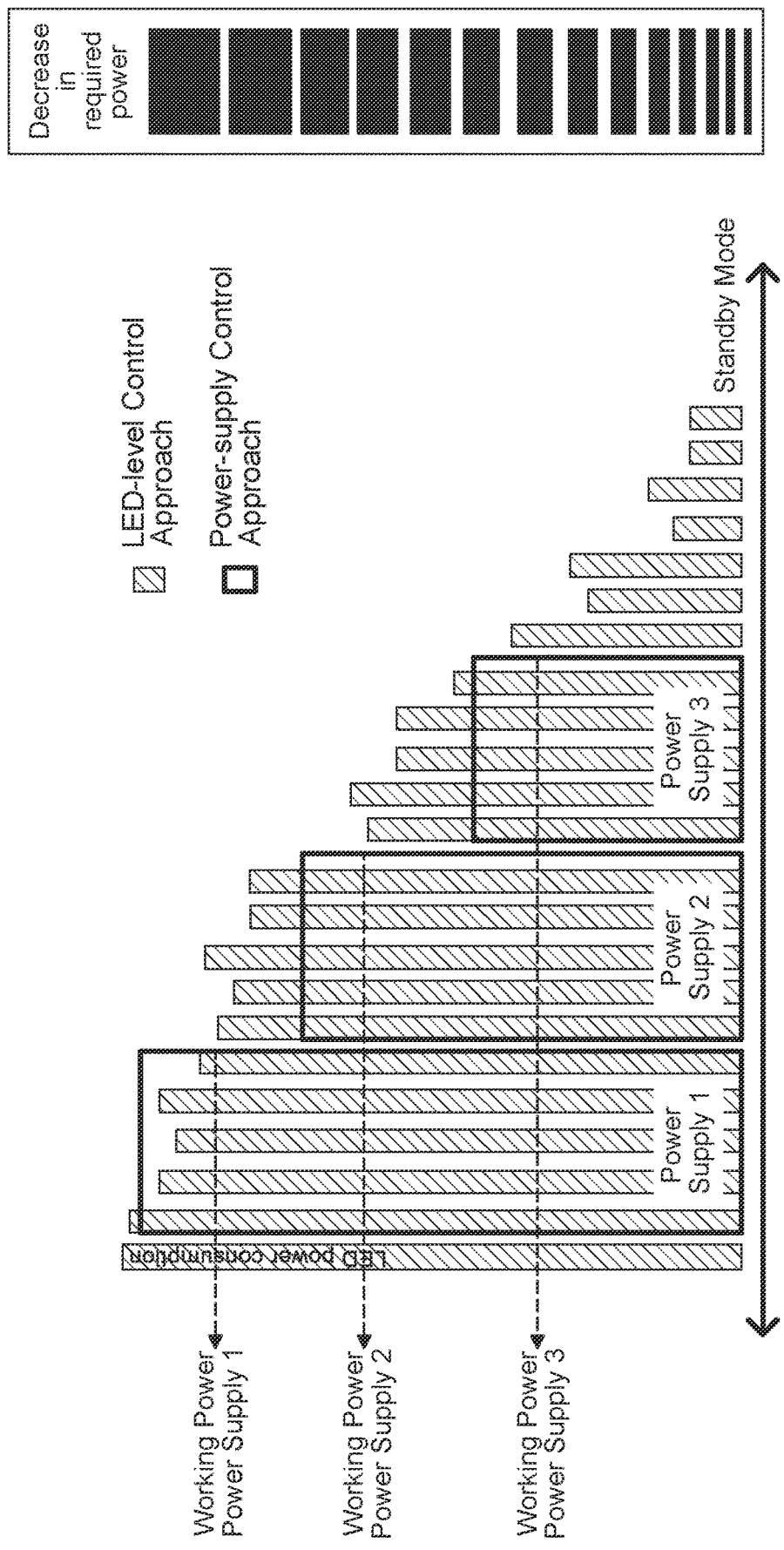
FIG. 7 illustrates a LED-level control approach combined with a power-supply control approach, in accordance with one embodiment.

Now that different embodiments of the technology have been described, some nonlimitative examples illustrating potential implementations of the techniques will be presented, as depicted in FIGS. 5 to 7. It should be noted that these examples serve an illustrative purpose only and should therefore not be considered limitative.

As a first example, techniques for monitoring and managing reactive power in an electrical grid according to American standards will be described.

A greenhouse vegetable grower based in the United States must follow local grid regulations about the generation of harmonic and harmonic distortions. The greenhouse lighting system (i.e., the horticultural light sources) is equipped with a power regulation mechanism to minimize or at least reduce, and control harmonics generated by the lighting system in the electrical grid.

As it has been previously explained, harmonics are a distortion of current waveforms on the grid powerline resulting from the non-linear load of the lamp equipment. The changes in the load resulting from the variations in the spectral rendering of the greenhouse lamp fixtures during the photoperiod may result in the load being lower than the installations power factor, having the effect of generating harmonics distortion on the grid side. Harmonics are known to have a negative impact on the distribution network.

The greenhouse implements supplemental lighting, which is generated by the horticultural light sources. The supplement in SPD and intensity are dictated by readings obtained from a spectrometer network operatively connected to the horticultural light sources. For example, during sunny episodes, the requirements for the supplemental lighting may become exceptionally low, lowering the current below the power factor, resulting in harmonics distortions being generated in the electrical grid.

During sunny days (e.g., at mid-day), the complementary intensity required by the lamps pool for compensation tends to be significantly lower in comparison with darker days, which brings the lamps pool power consumption below the desired power factor, thus emitting harmonic distortion on the power line.

In the absence of additional protection mechanism, there would be no control on harmonics and the operator would not be able to ensure compliance with the grid requirements.

In the United States, a greenhouse operator must comply with the IEEE 519-2014 guidelines for recommended practices and requirements for harmonics control in electric power systems. This guideline requires that acceptable harmonics limits for the 99th percentile must stay within a daily Total Harmonic Distortion (THD) level of 3.75%.

The operator of the greenhouse also has to respect other constraints in relation to lighting. For example, the growth plan requires specific Daily Light Integrals (DLI) targets and daily color ratios to be achieved. As a result, any power management decisions should take into consideration those targets.

In some implementations, the operator of the green house may configure the regulation mechanism as follows:
Maximum daily THD: 3.75%;
DLI Target (mol $m^{-2}$ $d^{-1}$): 14, priority 1;
Red to Far Red ratio: 2.5, priority 2;
Red to Blue ratio: 1.6, priority 3; and
Blue to Green ratio: 1.2, priority 4.

The regulation process first performs an estimation of the power factor change, based on the running light recipe and ongoing supplemental lighting requirements, a few seconds ahead of being rendered by the lamp pool. As such, the regulation mechanism can anticipate or predict an upcoming power factor.

If consumption falls at levels lower than the power factor, then a decision must be made on how to handle the situation. The regulation mechanism may use the input policies values as an input to decide on how to enforce the policies while staying as close as possible to the daily integral targets. The regulation mechanism may take into account prioritization weight in the decision process, so that the most important action may be prioritized.

The regulation mechanism may also rely on historical data as part of the decision process, for instance, how many times a detrimental power factor has happened in the last 24 hours would inform the decision process about the current state of compliance and may have an impact on the decision process.

To mitigate suboptimal situations, the regulation mechanism first makes an evaluation of the current level of compliance with configured policies, for instance how it stands against the daily limits, and may also evaluate other factors such as the integral targets, considering the prioritization weight in the decision process.

As a result of the decision process, a strategy, or a combination of strategies, to eliminate or minimize the harmonics emission, will be activated. For instance, the system could handle the situation by down switching the at least one power supply to a power source with a more adequate power factor profile.

This mechanism allows the operator to operate a non-linear power load demand generated by a large farm of variable spectrum and intensity lamps while staying within the guidelines for harmonic control in electric power systems in the United States.

As a second example, techniques for monitoring and managing reactive power in an electrical grid according to Canadian standards will be described.

A greenhouse located in Quebec must follow certain power grid regulations related to electricity use. Emitted harmonics levels should not exceed 7 MVA.

As previously mentioned, the greenhouse implements supplemental lighting. The supplement in SPD and intensity are dictated by readings obtained from a spectrometer network. Especially during sunny days, when there is also an alternating presence of dense clouds, material changes may happen quickly and often in the compensation SPD and intensity, resulting in significant variations in the current load.

The operator also has to other constraints in relation to lighting, most importantly the growth plan requires specific DLI targets to be achieved.

During sunny days, in mid-day, the complementary intensity required by the lamps pool for compensation tends to be significantly lower, bring the lamps pool power consumption below the desired power factor, thus emitting harmonic distortion on the power line.

In the absence of additional protection mechanism, there would be no control on harmonics and the operator would not be able to ensure compliance with the grid requirements.

The operator also has to other constraints in relation to lighting, most importantly the growth plan requires specific DLI targets be achieved. So, any power management decisions that must be made must take into consideration those targets.

In that case, the regulation system is provisioned with the following rules:

Harmonics target (MVA): 7; and
DLI Target (mol m−2 d−1): 16, priority: 1.

The regulation process first performs an estimation of the power factor changes based on the running light recipe and ongoing supplemental lighting requirements, a few seconds ahead of being rendered by the lamp pool.

If consumption falls at levels lower than the power factor, then a decision must be made on how best to handle the situation: the regulation mechanism uses the input policies values as input to decide on how best to enforce the policies while staying as close as possible to the daily integral targets. The regulation mechanism considers the prioritization weight in the decision process to prioritize decisions.

The regulation mechanism also uses historical data as part of the decision process, for instance, how many times a detrimental power factor has happened in the last 24 hours would inform the decision process about the current state of compliance and may have an impact on the decision process.

To mitigate the situation, the regulation mechanism first makes an evaluation of the current level of compliance with configured policies, for instance how it stands against the daily limits, it also evaluates other factors such as the integral targets, considering the prioritization weight in the decision process.

As a result of the decision process, a strategy, or a combination of strategies, to eliminate or minimize the harmonics emission, will be activated. For instance, the system could handle the situation by down switching the at least one power supply to a power source with a more adequate power factor profile.

This mechanism allows the operator to operate a non-linear power load demand generated by a large farm of variable spectrum and intensity lamps while staying within the guidelines for harmonic control in electric power systems in Quebec.

As a third example, and turning to FIG. 7, there is depicted a scenario wherein the LED-level control approach (see the first class of embodiments presented above) is combined with the power-supply control approach (see the second class of embodiments presented above).

In this example, the horticultural light source may be operatively connected to three power supplies, respectively labeled as "power supply 1", "power supply 2" and "power supply 3". Each power supply is associated with a working power, as indicated by the dotted lines crossing the y-axis of the graph presented in FIG. 3. It should be noted that the working power of the power supplies may be different or not, depending on the targeted application. As illustrated, the LEDs can be operated to match or at least follow the decrease (or increase) in the required power until the power requirement or a variation thereof may not be attained by the control of the LEDs alone. In this case, the power-supply control approach may be used as a supplement or complement to the LED-level control approach. The combination of these two approaches may allow a better control of the power factor of the horticultural structure and/or components thereof.

FIGS. 5 and 6 illustrate two examples of the techniques herein disclosed.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the present disclosure.

The invention claimed is:

1. A system for monitoring and managing reactive power in an electrical grid, the system comprising:
   a plurality of horticultural light sources operatively connected to the electrical grid;
   a reactive power monitoring module operatively connected to the plurality of horticultural light sources, the reactive power monitoring module being configured to:
      determine or predict distortive effects produced by the plurality of horticultural light sources in the electrical grid; and
      send illumination instructions to the plurality of horticultural light sources in response to the determined or predicted distortive effects, the illumination instructions causing an increase of a power factor of at least one of the plurality of horticultural light sources;

an estimation module operatively connected to the plurality of horticultural light sources, the estimation module being configured to:
receive a first set of inputs, the first set of inputs being representative of a power usage profile and/or a spectral density distribution of each of the horticultural light sources; and
output an estimation of an anticipated power factor; and
a decision module in data communication with the estimation module and operatively connected to the plurality of horticultural light sources, the decision module being configured to:
receive the estimation of the anticipated power factor and a second set of inputs, the second set of inputs being representative of a rule associated with a target power factor; and
produce a control signal, based on a comparison between the anticipated power factor and the target power factor, the control signal being sent towards the plurality of horticultural light sources, causing an adjustment of the anticipated power factor of the plurality of horticultural light sources to meet the target power factor.

2. The system of claim 1, wherein the distortive effects comprise at least one harmonic component.

3. The system of claim 1, wherein the distortive effects comprise at least one phase component.

4. The system of claim 1, wherein the increase is an effective increase of the power factor.

5. The system of claim 1, wherein the increase is an artificial increase of the power factor.

6. A method for monitoring and managing reactive power in an electrical grid, the method comprising:
determining or predicting distortive effects produced by a plurality of horticultural light sources in the electrical grid with a reactive power monitoring module;
providing illumination instructions to the plurality of horticultural light sources in response to the determined or predicted distortive effects, the illumination instructions causing an increase of a power factor of at least one of the plurality of horticultural light sources;
obtaining a first set of inputs with an estimation module, the first set of inputs being representative of a power usage profile and a spectral density distribution of each of the horticultural light source;
estimating an anticipated power factor with the estimation module;
obtaining, with a decision module in data communication with the estimation module, the estimation of the anticipated power factor and a second set of inputs, the second set of inputs being representative of a rule associated with a target power factor;
producing a control signal with the decision module, based on a comparison between the anticipated power factor and the target power factor; and
driving the plurality of horticultural light sources according to the control signal and the illumination instructions, the control signal causing an adjustment of the anticipated power factor of the plurality of horticultural light sources to meet the target power factor.

7. The method of claim 6, wherein the distortive effects comprise at least one harmonic component.

8. The method of claim 6, wherein the distortive effects comprise at least one phase component.

9. The method of claim 6, wherein the increase is an effective increase of the power factor.

10. The method of claim 6, wherein the increase is an artificial increase of the power factor.

11. A system for monitoring and managing reactive power in an electrical grid, the system including:
a plurality of horticultural light sources operatively connected to the electrical grid, each horticultural light source comprising a plurality of light-emitting diodes;
a reactive power monitoring module operatively connected to the plurality of horticultural light sources, the reactive power monitoring module being configured to:
determine a power factor associated with the light-emitting diodes of the plurality of horticultural lighting sources;
compare the determined power factor with a target power factor; and
produce a light-emitting control signal, the light-emitting control signal being sent towards the light-emitting diodes for driving the same, the light-emitting control signal causing an adjustment of the power factor of at least one of the plurality of horticultural light sources to meet the target power factor;
an estimation module operatively connected to the plurality of horticultural light sources, the estimation module being configured to:
receive a first set of inputs, the first set of inputs being representative of a power usage profile and/or a spectral density distribution of each of the horticultural light sources; and
output an estimation of an anticipated power factor; and
a decision module in data communication with the estimation module and operatively connected to the plurality of horticultural light sources, the decision module being configured to:
receive the estimation of the anticipated power factor and a second set of inputs, the second set of inputs being representative of a rule associated with a target power factor; and
produce a control signal, based on a comparison between the anticipated power factor and the target power factor, the control signal being sent towards the plurality of horticultural light sources, causing an adjustment of the anticipated power factor of the plurality of horticultural light sources to meet the target power factor.

12. The system of claim 11, wherein the reactive power monitoring module is further configured to receive inputs representative of measured data.

13. The system of claim 11, wherein the reactive power monitoring module is further configured to receive inputs representative of estimated data.

14. The system of claim 11, wherein the distortive effects comprise at least one harmonic component.

15. The system of claim 11, wherein the distortive effects comprise at least one phase component.

16. The system of claim 11, wherein the adjustment of the power factor is an effective increase of the power factor.

17. The system of claim 11, wherein the adjustment is an artificial increase of the power factor.

18. The system of claim 1, wherein the reactive power monitoring module, the estimation module and the decision module are integrated into a single module.

19. The system of claim 11, wherein the reactive power monitoring module, the estimation module and the decision module are integrated into a single module.

* * * * *